(12) United States Patent
Saito et al.

(10) Patent No.: US 9,897,219 B2
(45) Date of Patent: Feb. 20, 2018

(54) PRESSURE REDUCTION VALVE AND GAS SUPPLY DEVICE

(71) Applicants: TOYOTA JIDOSHA KABUSHIKI KAISHA, Toyota-shi, Aichi-ken (JP); JTEKT CORPORATION, Osaka-shi, Osaka (JP)

(72) Inventors: Norihiko Saito, Seto (JP); Sogo Goto, Miyoshi (JP); Masaaki Kondo, Owariasahi (JP); Akira Yamashita, Toyota (JP); Eiji Okawachi, Toyota (JP); Munetoshi Kuroyanagi, Nukata (JP); Toshikatsu Kubo, Obu (JP); Takashi Iwaguchi, Nagoya (JP)

(73) Assignees: Toyota Jidosha Kabushiki Kaisha, Toyota-shi, Aichi-ken (JP); JTEKT Corporation, Osaka-shi, Osaka (JP)

( * ) Notice: Subject to any disclaimer, the term of this patent is extended or adjusted under 35 U.S.C. 154(b) by 0 days.

(21) Appl. No.: 14/926,995

(22) Filed: Oct. 29, 2015

(65) Prior Publication Data
US 2016/0138726 A1     May 19, 2016

(30) Foreign Application Priority Data
Nov. 13, 2014    (JP) .................................. 2014-230453

(51) Int. Cl.
*G05D 16/02*     (2006.01)
*F16K 17/04*     (2006.01)
(Continued)

(52) U.S. Cl.
CPC ................ *F16K 17/04* (2013.01); *F16K 1/32* (2013.01); *F16K 17/044* (2013.01); *F16K 17/06* (2013.01);
(Continued)

(58) Field of Classification Search
CPC ......... Y10T 137/7823; Y10T 137/7824; Y10T 137/7825; Y10T 137/7826; G05D 16/10;
(Continued)

(56) References Cited

U.S. PATENT DOCUMENTS 2,618,908 A * 11/1952 Salter ..................... G05D 16/10
                                                        137/315.04
2,854,207 A *  9/1958 Hammon ........... G05D 16/0663
                                                        137/505.42
(Continued)

FOREIGN PATENT DOCUMENTS

| JP | 2014-096094 | 5/2014 |
|----|-------------|--------|
| KR | 10-2000-0061714 | 10/2000 |
| KR | 10-2014-0090764 | 7/2014 |

*Primary Examiner* — William McCalister
(74) *Attorney, Agent, or Firm* — Finnegan, Henderson, Farabow, Garrett & Dunner, LLP (57) ABSTRACT

The pressure reduction valve includes: a cylindrical portion, a piston and a spring. The cylindrical portion includes an inlet communicating with the primary side flow path and an outlet communicating with the secondary side flow path. The piston fitted into the cylindrical portion is slidable along an axis direction of the cylindrical portion within the cylindrical portion, and defines, within the cylindrical portion, a space communicating with the inlet and the outlet. The spring applies, to the piston, a force acting toward the space. The outlet is displaced in one direction from the center of the piston when seen in the axis direction. The force applied to the piston by the spring is distributed so as to deviate from the center of the piston to the side of the outlet.

6 Claims, 7 Drawing Sheets

(51) Int. Cl.
  *F16K 1/32*      (2006.01)
  *H01M 8/04089*   (2016.01)
  *F16K 25/02*     (2006.01)
  *G05D 16/10*     (2006.01)
  *F16K 17/06*     (2006.01)

(52) U.S. Cl.
  CPC ............ *F16K 25/02* (2013.01); *G05D 16/02* (2013.01); *G05D 16/10* (2013.01); *H01M 8/04089* (2013.01)

(58) Field of Classification Search
  CPC .... G05D 16/103; G05D 16/106; G05D 16/02; F16K 17/04; F16K 1/32; H01M 8/04089
  USPC ............... 137/505.39, 505.4, 505.41, 505.42
  See application file for complete search history.

(56) References Cited

U.S. PATENT DOCUMENTS

| | | | | |
|---|---|---|---|---|
| 2,984,252 A * | 5/1961 | Bryant | ............... | G05D 16/0663 137/116.5 |
| 3,323,535 A * | 6/1967 | Klemm | ................. | B23Q 5/266 137/110 |
| 3,348,573 A * | 10/1967 | Bradford | ............... | F16K 31/122 137/116.5 |
| 3,812,877 A * | 5/1974 | Fleischhacker | .... | G05D 16/0663 137/116.5 |
| 3,972,346 A * | 8/1976 | Wormser | ............... | G05D 16/02 137/505.42 |
| 4,246,931 A * | 1/1981 | O'Connor | ............ | F16K 31/365 137/494 |
| 4,282,766 A * | 8/1981 | Huber | ..................... | F16F 1/041 137/315.07 |
| 4,450,858 A * | 5/1984 | Acomb | .............. | G05D 16/0663 137/484.8 |
| 4,660,597 A * | 4/1987 | Cowles | ................... | F02M 69/54 137/505.39 |
| 5,086,807 A * | 2/1992 | Lasnier | .................. | G05D 16/10 137/505.11 |
| 5,255,711 A * | 10/1993 | Reeds | ............... | G05D 16/0655 137/505.41 |
| 6,161,573 A * | 12/2000 | Sheng | .................... | G05D 16/10 137/505.41 |
| 6,170,519 B1 * | 1/2001 | Carroll | .................... | G05D 16/10 137/505 |
| 6,363,964 B1 * | 4/2002 | Carroll | .................... | G05D 16/10 137/505.41 |
| 6,705,343 B2 | 3/2004 | Claire et al. | | |
| 7,363,938 B1 * | 4/2008 | Newton | ............... | G05D 16/0672 137/315.05 |
| 2003/0196701 A1* | 10/2003 | Claire | .................... | G05D 16/10 137/505.39 |

\* cited by examiner

PRESSURE REDUCTION VALVE AND GAS SUPPLY DEVICE

CROSS-REFERENCE TO RELATED APPLICATION

This application claims priority based on Japanese Patent Application No. 2014-230453 filed on Nov. 13, 2014, the entire disclosure of which is hereby incorporated by reference.

BACKGROUND

Field

The present invention relates to a pressure reduction valve and a gas supply device.

Related Art

As a pressure reduction valve of a gas supply device, a pressure reduction valve is known where a piston to which a force is applied by a spring is used to reduce the pressure of a gas supplied from a primary side flow path to a secondary side flow path in a space defined within a cylindrical portion (see JP2014-96094).

SUMMARY

Disadvantageously, in the pressure reduction valve of JP2014-96094, the piston which receives reflected waves transmitted from the secondary side flow path is vibrated, and thus noise may be produced. Hence, a pressure reduction valve that can reduce the noise produced by the reflected waves transmitted from the secondary side flow path has been desired.

The present invention is made to solve at least part of the problem described above, and the solution can be realized by the following aspects.

(1) According to one aspect of the present invention provides a pressure reduction valve reducing pressure of a gas supplied from a primary side flow path to a secondary side flow path. The pressure reduction valve comprises: a cylindrical portion that includes an inlet communicating with the primary side flow path and an outlet communicating with the secondary side flow path; a piston fitted into the cylindrical portion, the piston being slidable along an axis direction of the cylindrical portion within the cylindrical portion, the piston defining, within the cylindrical portion, a space communicating with the inlet and the outlet; and a spring that applies, to the piston, a force acting toward the space, wherein the outlet is displaced in one direction from the center of the piston when seen in the axis direction, and a force applied to the piston by the spring is distributed so as to deviate from the center of the piston to the side of the outlet. In this aspect, since the force applied by the spring to the piston which is easily inclined toward the side of the outlet where the pressure is relatively low in the space defined within the cylindrical portion is distributed so as to deviate to the side of the outlet, it is possible to increase the sliding resistance of the piston which slides within the cylindrical portion. In this way, it is possible to reduce the vibrations of the piston caused by the reflected waves transmitted from the secondary side flow path. Consequently, it is possible to reduce the noise caused by the reflected waves transmitted from the secondary side flow path.

(2) In the pressure reduction valve of the above aspect, a part of the spring in contact with the piston may be distributed so as to deviate from the center of the piston to the side of the outlet. In this aspect, it is possible to easily realize the applied force which is distributed so as to deviate to the side of the outlet.

(3) In the pressure reduction valve of the above aspect, a part of the spring in contact with the piston may overlap at least part of the outlet. In this aspect, it is possible to easily realize the applied force which is distributed so as to deviate to the side of the outlet.

(4) In the pressure reduction valve of the above aspect, the spring may be a coil spring, and the outlet may be located at an angle of 90° from an end portion of the spring in contact with the piston toward a direction of winding of the spring with respect to the center of the piston when seen in the axis direction. In this aspect, it is possible to further increase the sliding resistance of the piston. In this way, it is possible to reduce the vibrations of the piston caused by the reflected waves transmitted from the secondary side flow path even further. Consequently, it is possible to further reduce the noise caused by the reflected waves transmitted from the secondary side flow path.

(5) According to one aspect of the present invention, a gas supply device is provided. The gas supply device includes: the pressure reduction valve of the above aspects; and an injection portion that is connected to the secondary side flow path and injects a gas within the secondary side flow path. In this aspect, it is possible to reduce the noise of the pressure reduction valve caused by the reflected waves resulting from the injection of the gas by the injection portion.

The present invention can be realized by various aspects other than the pressure reduction valve and the gas supply device. For example, the invention of the present application can be realized by a fuel cell system having a pressure reduction valve, a method of reducing a gas, and the like.

BRIEF DESCRIPTION OF DRAWINGS

The invention will be described with reference to the accompanying drawings in which.

DESCRIPTION OF EMBODIMENTS

A. First Embodiment

Figure 1:
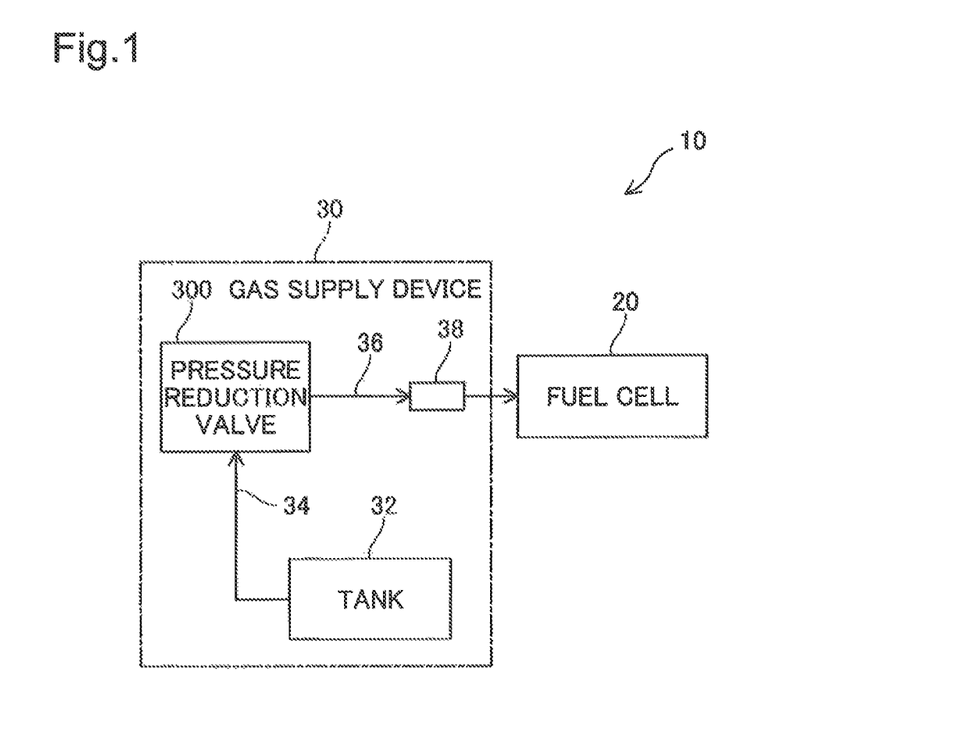
FIG. 1 is an illustrative diagram showing a configuration of a fuel cell system.

FIG. 1 is an illustrative diagram showing the configuration of a fuel cell system 10. The fuel cell system 10 includes a fuel cell 20 and a gas supply device 30. In the present embodiment, the fuel cell system 10 is mounted on a vehicle, and supplies power used for the travel of the vehicle.

The fuel cell 20 of the fuel cell system 10 generates power based on the electrochemical reaction of reactive gases. In the present embodiment, the fuel cell 20 generates power based on the electrochemical reaction of hydrogen and oxygen. In the present embodiment, hydrogen gas and air are supplied to the fuel cell 20 as the reactive gases.

The gas supply device 30 is a device that supplies a gas. In the present embodiment, the gas supply device 30 supplies hydrogen gas to the fuel cell 20. The gas supply device 30 includes a tank 32, a gas flow path 34, a gas flow path 36, an injector 38, and a pressure reduction valve 300.

The tank 32 of the gas supply device 30 is a container in which a gas is stored. In the present embodiment, the tank 32 stores hydrogen gas. The gas flow path 34 of the gas supply device 30 is a primary side flow path along which the gas is passed from the tank 32 to the pressure reduction valve 300. The gas flow path 36 of the gas supply device 30 is a secondary side flow path along which the gas is passed from the pressure reduction valve 300 to the injector 38. The injector 38 of the gas supply device 30 is an injection portion which is connected to the gas flow path 36 and which injects the gas within the gas flow path 36 to the side of the fuel cell 20.

Figure 2:
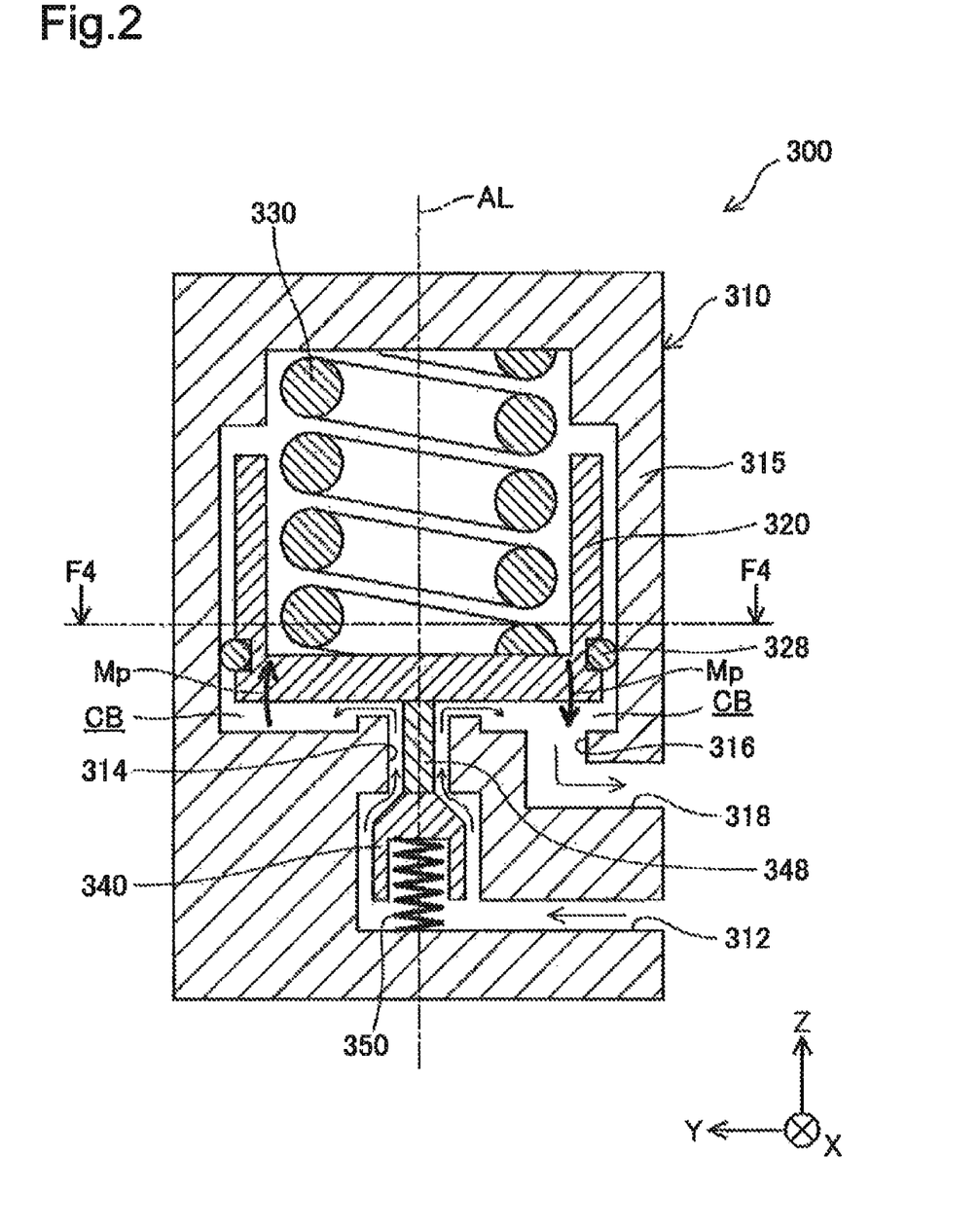
FIG. 2 is a cross-sectional view schematically showing the internal structure of a pressure reduction valve.
Figure 3:
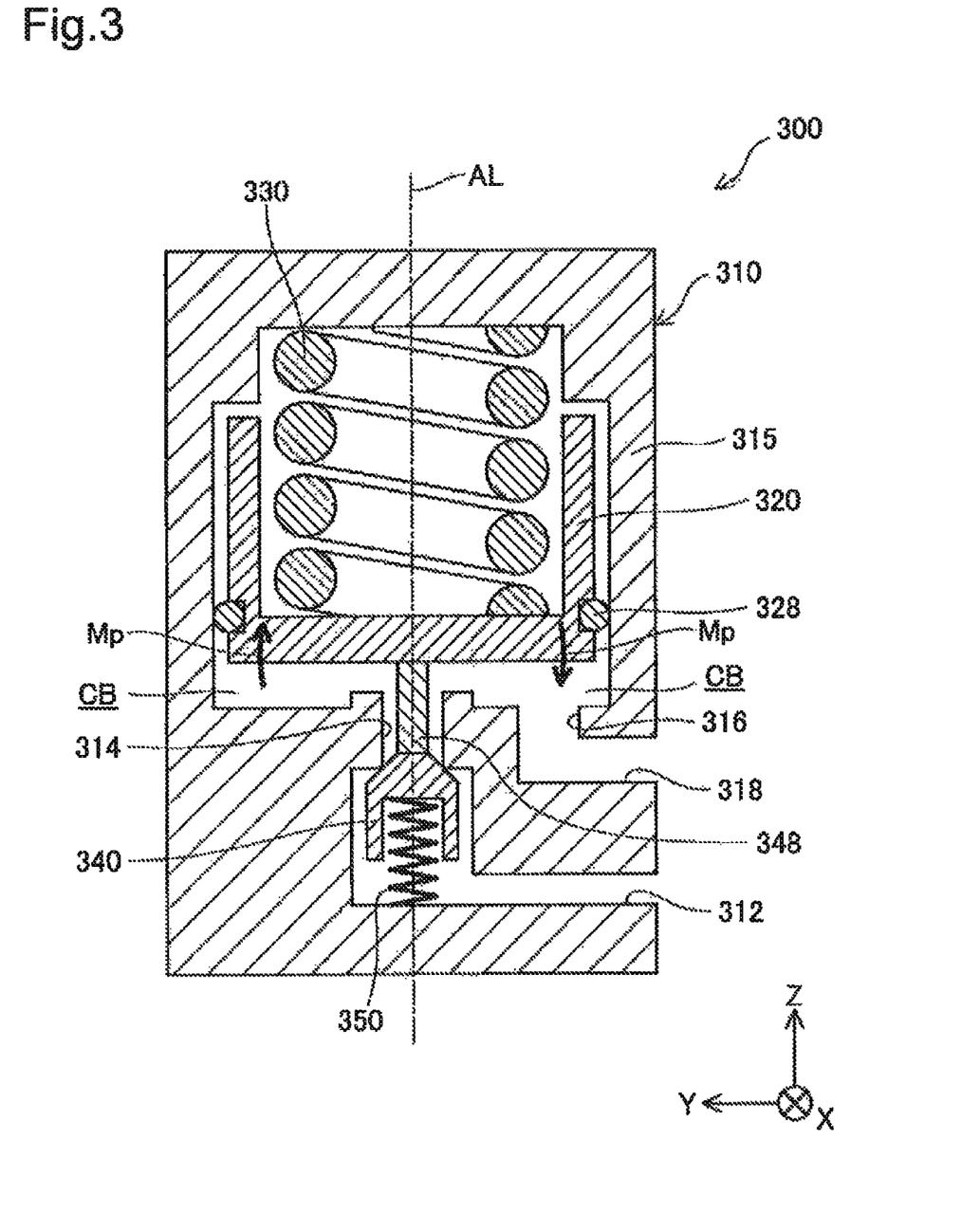
FIG. 3 is a cross-sectional view schematically showing the internal structure of the pressure reduction valve.

FIGS. 2 and 3 are cross-sectional views schematically showing the internal structure of the pressure reduction valve 300. In the state of the pressure reduction valve 300 in FIG. 2, the area between the gas flow path 34 and the interior of the pressure reduction valve 300 is opened. In the state of the pressure reduction valve 300 in FIG. 3, the area between the gas flow path 34 and the interior of the pressure reduction valve 300 is closed. FIGS. 2 and 3 schematically show a cross-sectional shape of the pressure reduction valve 300 taken along a plane passing through the axis AL of the pressure reduction valve 300.

In FIGS. 2 and 3, X, Y and Z axes are shown. The X, Y and Z axes of FIGS. 2 and 3 have an X axis, a Y axis and a Z axis as three spatial axes perpendicularly intersecting each other. With respect to an X axis direction along the X axis, +X axis direction refers to a positive direction extending from the front of the plane of the figure to the back of the plane of the figure, and −X axis direction refers to a negative direction extending toward the opposite side of the +X axis direction. With respect to a Y axis direction along the Y axis, +Y axis direction refers to a positive direction extending from the right side of the plane of the figure to the left side of the plane of the figure, and −Y axis direction refers to a negative direction extending toward the opposite side of the +Y axis direction. In the present embodiment, the Z axis is an axis along the axis AL of the pressure reduction valve 300. With respect to a Z axis direction along the Z axis, +Z axis direction refers to a positive direction extending from the lower side of the plane of the figure to the upper side of the plane of the figure, and −Z axis direction refers to a negative direction extending toward the opposite side of the +Z axis direction. The X, Y and Z axes of FIGS. 2 and 3 correspond to the X, Y and Z axes of the other figures.

The pressure reduction valve 300 of the gas supply device 30 reduces the pressure of the gas supplied from the gas flow path 34 to the gas flow path 36. The pressure reduction valve 300 includes a main body 310, a piston 320, a spring 330, a valve member 340, a pin 348, and a spring 350.

The main body 310 of the pressure reduction valve 300 is a housing that retains, therewithin, the piston 320, the spring 330, the valve member 340, the pin 348 and the spring 350. In the present embodiment, the main body 310 is formed by combining a plurality of members. In the present embodiment, the members of the main body 310 are made of stainless steel. The main body 310 includes a cylindrical portion 315, a flow path 312 and a flow path 318.

The cylindrical portion 315 of the main body 310 is a cylindrical part. The cylindrical portion 315 defines, therewithin, a columnar space connected to an inlet 314 and an outlet 316. In the present embodiment, the cylindrical portion 315 is cylindrical about the axis AL, and defines, therewithin, a columnar space about the axis AL.

The flow path 312 of the main body 310 is a flow path that is connected to the gas flow path 34. The flow path 312 passes the gas flowing from the as flow path 34 to the inlet 314 of the cylindrical portion 315.

The flow path 318 of the main body 310 is a flow path that is connected to the gas flow path 36. The flow path 318 passes the gas flowing from the outlet 316 of the cylindrical portion 315 to the gas flow path 36.

The valve member 340 of the pressure reduction valve 300 opens and closes the inlet 314. In the present embodiment, the valve member 340 is formed slidably along the axis AL within the flow path 312. The pin 348 of the pressure reduction valve 300 is arranged within the outlet 316, and transmits the displacement of the piston 320 to the valve member 340. The spring 350 of the pressure reduction valve 300 applies, to the valve member 340, a force acting in such a direction (+Z axis direction) such that the valve member 340 blocks the inlet 314.

As shown in FIG. 2, when the pressure of a space CB defined by the piston 320 is lower than a predetermined value, the valve member 340 opens the inlet 314 according to the displacement of the piston 320. Thus, the gas flows from the gas flow path 34 through the flow path 312 and the inlet 314 into the space CB, with the result that the pressure of the space CB is increased.

As shown in FIG. 3, when the pressure of the space CB is equal to or more than a predetermined value, the valve member 340 blocks the inlet 314 according to the displacement of the piston 320. Thus, the flow of the gas from the gas flow path 34 into the space CB is stopped. Thereafter, when the was is injected from the injector 38, the gas flows from the space CB through the outlet 316 and the flow path 318 out to the gas flow path 36, with the result that the pressure of the space CB is lowered.

The piston 320 of the pressure reduction valve 300 is cylindrical so as to fit into the cylindrical portion 315. In the present embodiment, the piston 320 is cylindrical about the axis AL. The piston 320 is formed slidably along the axis AL within the cylindrical portion 315. In the present embodiment, the piston 320 is formed of stainless steel. In the present embodiment, on the outer circumference of the piston 320, a seal member 328 is provided that hermetically seals the area between the piston. 320 and the inner wall of the cylindrical portion 315.

The piston 320 defines, within the cylindrical portion 315, the space CB communicating with the inlet 314 and the outlet 316. In the present embodiment, the space CB is defined on the side of −Z axis direction with respect to the piston 320. In the present embodiment, the space CB is the space about the axis AL.

In the present embodiment, the inlet 314 is arranged uniformly around the axis AL. In the present embodiment, the outlet 316 is displaced from the axis AL toward one direction (−Y axis direction). Hence, the distribution of the pressure of the space CB deviates, and thus the pressure from the axis AL on the side of +Y axis direction tends to be higher than that from the axis AL on the side of −Y axis direction. Thus, a moment Mp acting in such a direction as to incline the side of −Y axis direction from the axis AL toward the side of −Z axis direction is applied to the piston 320.

A force that is applied by the spring 330 of the pressure reduction valve 300 and that acts toward the space GB is applied to the piston 320. The force applied by the spring 330 to the piston 320 is distributed so as to deviate from the axis AL at the center of the piston 320 to the side of the outlet 316. In this way, the moment Mp applied to the piston 320 is increased.

In the present embodiment, the spring 330 is a coil spring. In the present embodiment, the spring 330 expands and contracts along the axis AL (the Z axis). In the present embodiment, on the side of +Z axis direction, the spring 330 is in contact with the main body 310, and on the side of −Z axis direction, the spring 330 is in contact with the piston 320.

Figure 4:
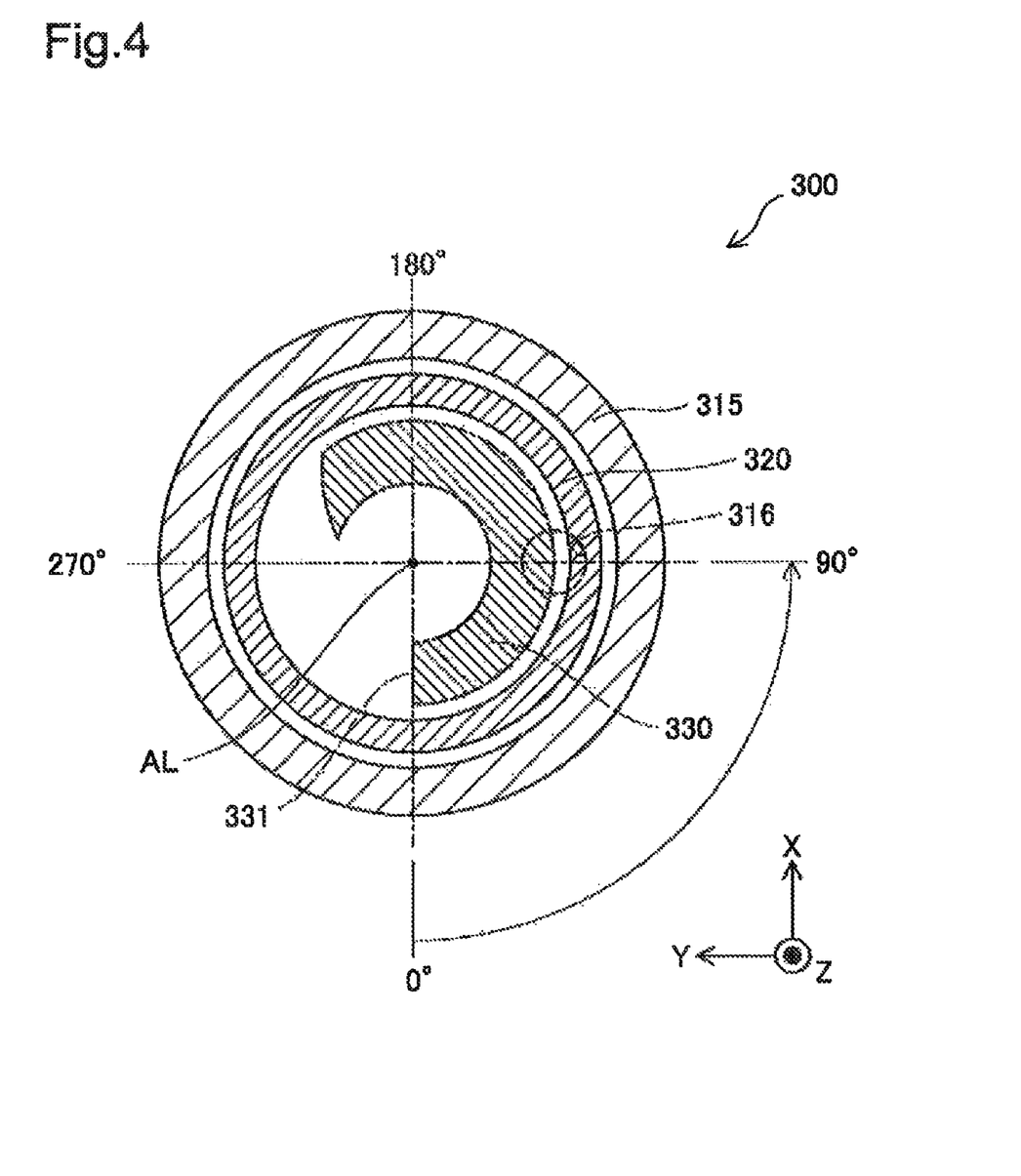
FIG. 4 is an illustrative diagram showing a cross section of the pressure reduction valve.

FIG. 4 is an illustrative diagram showing a cross section of the pressure reduction valve 300. FIG. 4 shows the cross section of the cylindrical portion 315 and the piston 320 when seen from the line F4-F4 (in +Z axis direction) indicated by arrows in FIG. 2. In FIG. 4, the outlet 316 is indicated by broken lines in a position displaced from the axis AL toward −Y axis direction. In FIG. 4, the part of the spring 330 in contact with the piston 320 is indicated by dashed lines and hatching. In the present embodiment, the part of the spring 330 in contact with the piston 320 is distributed so as to deviate from the axis AL at the center of the piston 320 to the side of the outlet 316.

In the present embodiment, when seen in the Z axis direction, which is the axis direction of the cylindrical portion 315, the part of the spring 330 in contact with the piston 320 overlaps at least part of the outlet 316. In the other embodiments, when seen in the Z axis direction, which is the axis direction of the cylindrical portion 315, the part of the spring 330 in contact with the piston 320 may be displaced from the outlet 316.

In the present embodiment, when seen in the Z axis direction, which is the axis direction of the cylindrical portion 315, the outlet 316 is located at an angle of 90° from the end portion 331 of the spring 330 in contact with the piston 320 toward the direction of winding of the spring 330 with respect to the axis AL about the piston 320. In the other embodiments, the outlet 316 may be located at an angle of 90° to 180° from the end portion 331 of the spring 330 in contact with the piston 320 toward the direction of winding of the spring 330.

Figure 5:
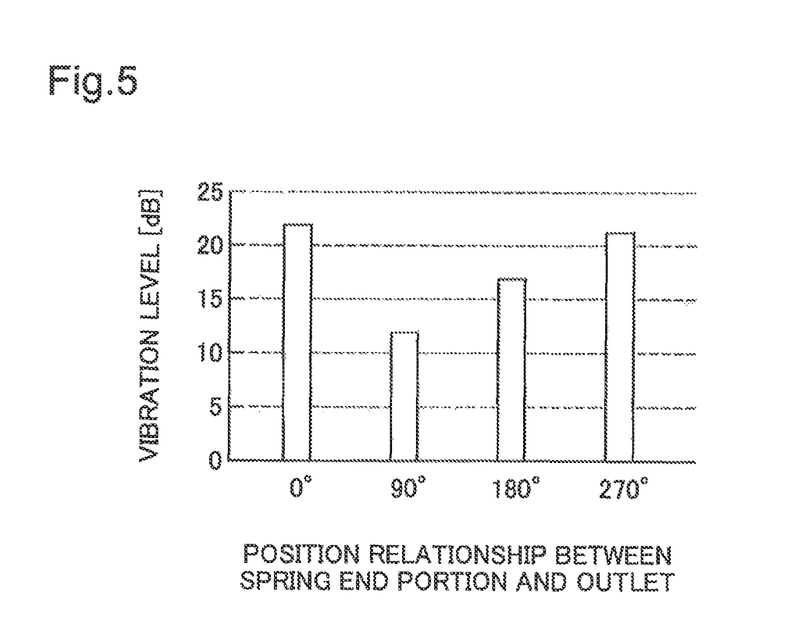
FIG. 5 is a graph showing the results of evaluation of the vibration level of the pressure reduction valve.

FIG. 5 is a graph showing the results of evaluation of the vibration level of the pressure reduction valve. The horizontal axis of FIG. 5 represents the position relationship between the end portion 331 of the spring 330 and the outlet 316. The vertical axis of FIG. 5 represents the vibration level of the pressure reduction valve.

In the evaluation test of FIG. 5, a tester prepared, as samples 1 to 4, four pressure reduction valves in which the position relationship between the end portion 331 of the spring 330 and the outlet 316 is different. The sample 2 is the same as the pressure reduction valve 300 shown in FIGS. 2 to 4, and the samples 1, 3 and 4 are the same as the pressure reduction valve 300 shown in FIGS. 2 to 4 except for the position relationship of the outlet 316. The tester used the pressure reduction valve of each sample to reduce the pressure of the gas, and measured the vibration level of the vibrations of the pressure reduction valve at that time. The vibration level of the pressure reduction valve correlates with the noise level of the pressure reduction valve, and as the vibration level is increased, the noise level is increased.

The outlet 316 of the sample 1 was located at an angle of 0° from the end portion 331 of the spring 330 toward the direction of winding of the spring 330 with respect to the axis AL. The outlet 316 of the sample 2 was located at an angle of 90° from the end portion 331 of the spring 330 toward the direction of winding of the spring 330 with respect to the axis AL. The outlet 316 of the sample 3 was located at an angle of 180° from the end portion 331 of the spring 330 toward the direction of winding of the spring 330 with respect to the axis AL. The outlet 316 of the sample 4 was located at an angle of 270° from the end portion 331 of the spring 330 toward the direction of winding of the spring 330 with respect to the axis AL.

It is found from the results of the evaluation in FIG. 5 that in terms of reducing the noise, the outlet 316 is preferably located at an angle of 90° from the end portion 331 of the spring 330 toward the direction of winding of the spring 330 with respect to the axis AL, and that it is possible to reduce the noise even when the outlet 316 is located at an angle of 180°. Hence, it can be considered that it is possible to reduce the noise by locating the outlet 316 at least in a range of 90° to 180° from the end portion 331 of the spring 330.

In the first embodiment described above, since the force applied by the spring 330 to the piston 320 which is easily inclined toward the side of the outlet 316 where the pressure is relatively low in the space CB defined within the cylindrical portion 315 is distributed so as to deviate to the side of the outlet 316, it is possible to increase the sliding resistance of the piston 320 which slides within the cylindrical portion 315. In this way, it is possible to reduce the vibrations of the piston 320 caused by the reflected waves transmitted from the gas flow path 36, which is the secondary side flow path. Consequently, it is possible to reduce the noise caused by the reflected waves transmitted from the secondary side flow path. In the gas supply device 30, it is possible to reduce the noise of the pressure reduction valve 300 caused by the reflected waves resulting from the injection of the gas by the injector 38.

Since the part of the spring 330 in contact with the piston 320 is distributed to deviate from the axis AL about the piston 320 toward the side of the outlet 316, it is possible to easily realize the applied force which is distributed to deviate toward the side of the outlet 316. When seen in the Z axis direction, which is the axis direction of the cylindrical portion 315, the part of the spring 330 in contact with the piston 320 overlaps at least part of the outlet 316, with the result that it is possible to easily realize the applied force which is distributed to deviate toward the side of the outlet 316.

Since the outlet 316 is located at an angle of 90° from the end portion 331 of the spring 330 in contact with the piston 320 toward the direction of winding of the spring 330 with respect to the axis AL about the piston 320, it is possible to further increase the sliding resistance of the piston 320. In this way, it is possible to further reduce the vibrations of the piston 320 caused by the reflected waves transmitted from the secondary side flow path. Consequently, it is possible to further reduce the noise caused by the reflected waves transmitted from the secondary side flow path.

B. Second Embodiment

Figure 6:
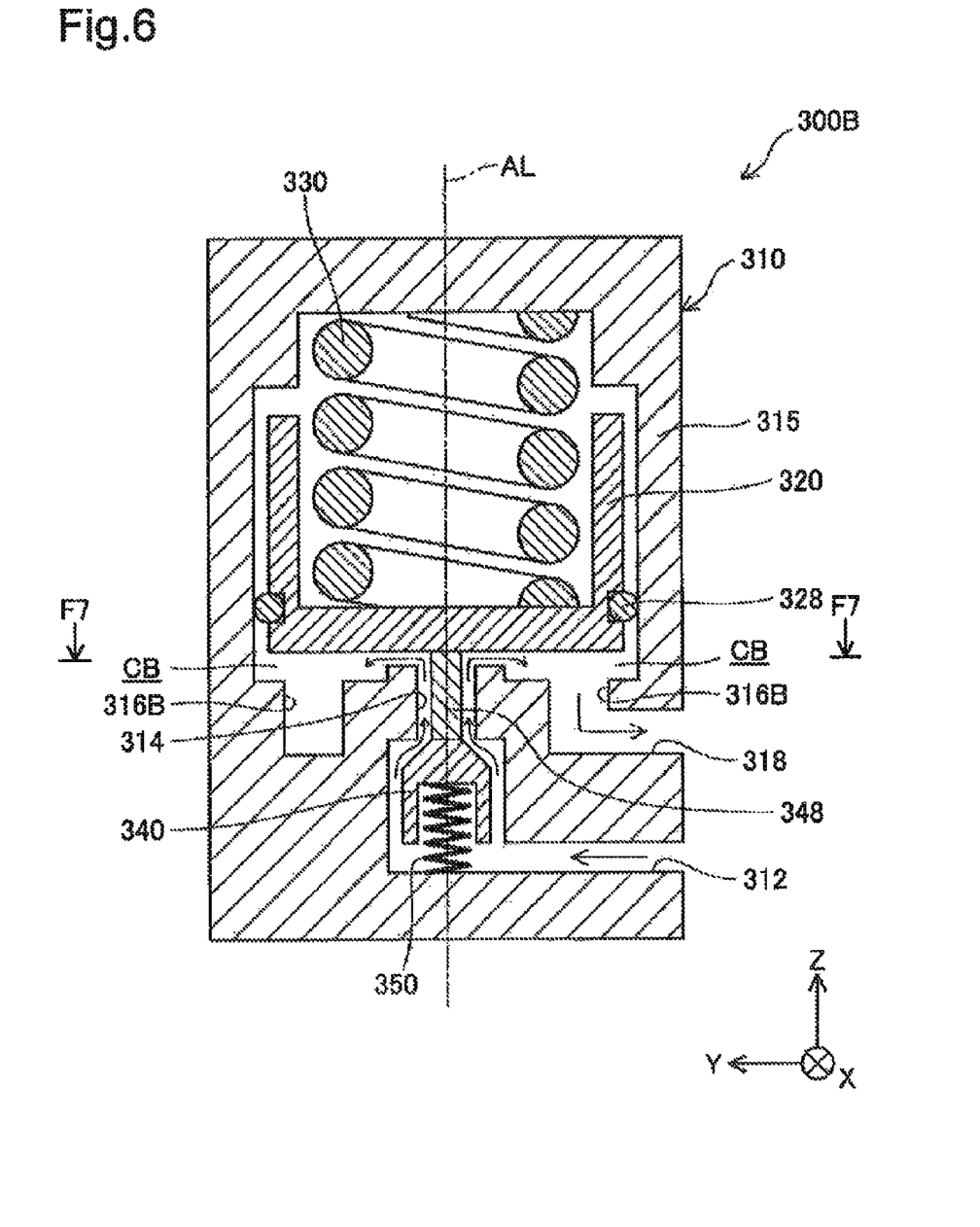
FIG. 6 is a cross-sectional view schematically showing the internal structure of a pressure reduction valve in a second embodiment.

FIG. 6 is a cross-sectional view schematically showing the internal structure of a pressure reduction valve 300B in a second embodiment. In FIG. 6, an X axis, a Y axis and a Z axis are shown as in FIG. 2. The pressure reduction valve 300B is the same as the pressure reduction valve 300 of the first embodiment except that an outlet 316B having a different shape from the outlet 316 is provided.

Figure 7:
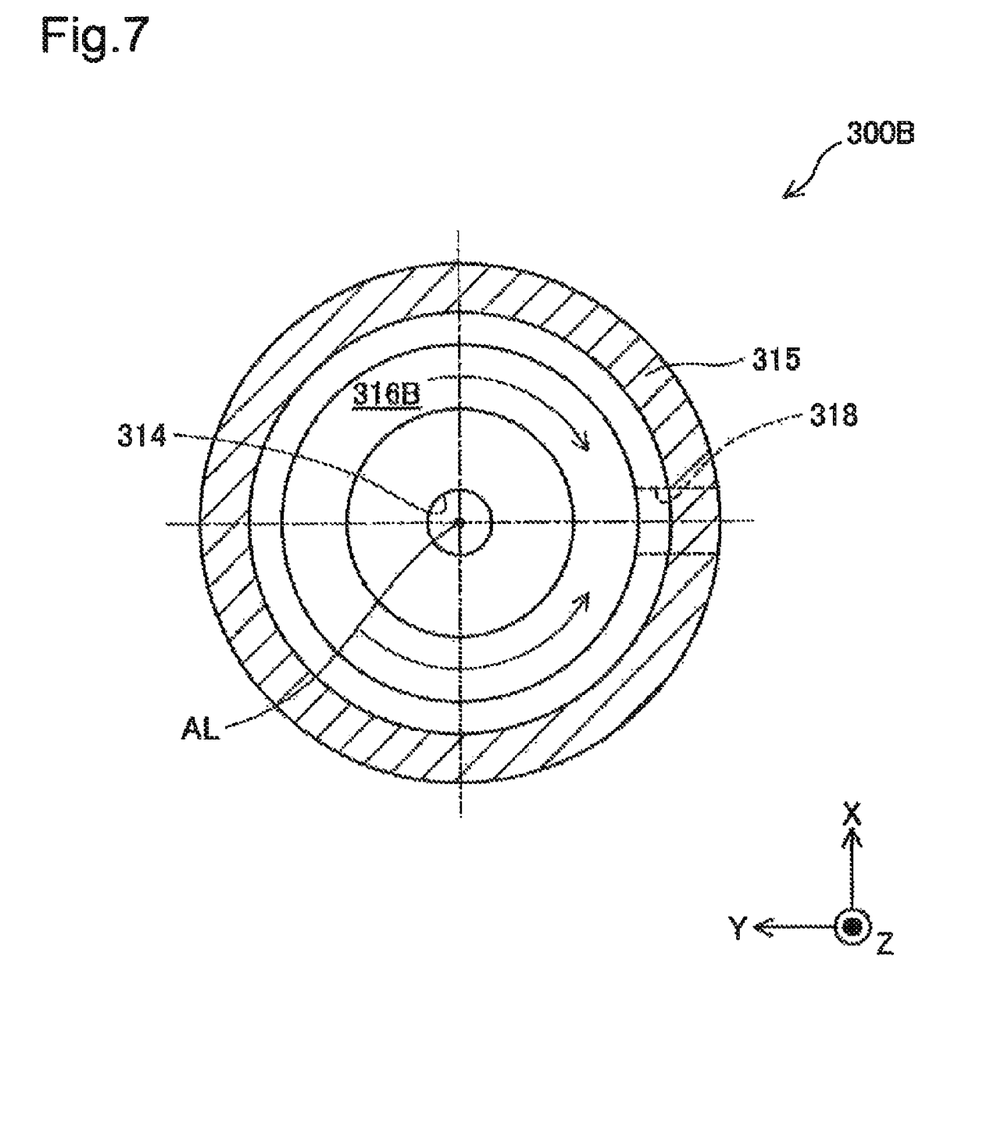
FIG. 7 is an illustrative diagram showing a cross section of the pressure reduction valve.

FIG. 7 is an illustrative diagram showing a cross section of the pressure reduction valve 300B. FIG. 7 shows the shape of the outlet 316B when seen from the line F7-F7 indicated by arrows in FIG. 6. The outlet 316B of the second embodiment is uniformly arranged around the axis AL outwardly with respect to the inlet 314. In the present embodiment, the outlet 316B is an annular groove about the axis AL.

In the second embodiment, since it is possible to reduce the hitting of the reflected waves transmitted from the gas flow path 36 serving as the secondary side flow path onto the piston 320 locally, it is possible to reduce the vibration of the piston 320 caused by the reflected waves transmitted from the as flow path 36 serving as the secondary side flow path. Consequently, it is possible to reduce the noise caused by the reflected waves transmitted from the secondary side flow path.

C. Other Embodiments

The present invention is not limited to the embodiments described above, examples or variations, and can be realized by various configurations without departing from the spirit thereof. For example, aspects corresponding to the technical features described in the section of "Summary of Invention" and the technical features in the examples and the variations can be replaced or combined as necessary so that part or the whole of the problem described above is solved or part or the whole of the effects described above is achieved. Unless the technical features are described as necessary parts in the present specification, they can be deleted as necessary.

The pressure reduction valve may further include an O-ring that is provided on the side surface of the piston 320 and that acts as a dumper on the sliding movement of the piston 320. In this way, it is possible to increase the sliding resistance of the inner wall of the cylindrical portion 315 and the side surface of the piston 320. Hence, it is possible to reduce the vibration, of the piston 320 caused by the reflected waves transmitted from the gas flow path 36 serving as the secondary side flow path. Consequently, it is possible to reduce the noise caused by the reflected waves transmitted from the secondary side flow path.

A relatively high-viscosity grease may be applied to the side surface of the piston 320. In this way, it is possible to increase the sliding resistance of the inner wall of the cylindrical portion 315 and the side surface of the piston 320. Hence, it is possible to reduce the vibration of the piston 320 caused by the reflected waves transmitted from the gas flow path 36 serving as the secondary side flow path. Consequently, it is possible to reduce the noise caused by the reflected waves transmitted from the secondary side flow path.

What is claimed is:

1. A pressure reduction valve reducing pressure of a gas supplied from a primary side flow path to a secondary side flow path, the pressure reduction valve comprising:
   a cylindrical portion that includes an inlet communicating with the primary side flow path and an outlet communicating with the secondary side flow path;
   a piston fitted into the cylindrical portion without being attached to the cylindrical portion, the piston being slidable along an axis direction of the cylindrical portion within the cylindrical portion and being configured to be inclined relative to the cylindrical portion toward the outlet so as to increase the sliding resistance of the piston within the cylindrical portion, the piston defining, within the cylindrical portion, a space communicating with the inlet and the outlet; and
   a spring that applies, to the piston, a force acting toward the space,
   wherein the outlet is displaced in one direction from the center of the piston when seen in the axis direction, and a net force applied to the piston by the spring is distributed so as to deviate from the center of the piston to the side of the outlet and cause a moment to be applied to the piston.

2. The pressure reduction valve according to claim 1, wherein a part of the spring in contact with the piston is distributed so as to deviate from the center of the piston to the side of the outlet.

3. The pressure reduction valve according to claim 1, wherein a part of the spring in contact with the piston overlaps at least part of the outlet.

4. The pressure reduction valve according to claim 1, wherein the spring is a coil spring, and the outlet is located at an angle of 90° from an end portion of the spring in contact with the piston toward a direction of winding of the spring with respect to the center of the piston when seen in the axis direction.

5. A gas supply device comprising:
   a pressure reduction valve according to claim 1; and
   an injection portion that is connected to the secondary side flow path and injects a gas within the secondary side flow path.

6. The reduction valve according to claim 1, wherein the moment applied to the piston moves the piston in an inclined manner with respect to the axis direction.

* * * * *